United States Patent [19]
Selzer et al.

[11] Patent Number: 5,078,448
[45] Date of Patent: Jan. 7, 1992

[54] CAB TO TRAILER AIR DEFLECTOR

[75] Inventors: Robert J. Selzer; David D. Bubb, both of Fort Wayne, Ind.

[73] Assignee: Navistar International Transportation Corp., Chicago, Ill.

[21] Appl. No.: 629,525

[22] Filed: Dec. 18, 1990

Related U.S. Application Data

[63] Continuation-in-part of Ser. No. 353,991, May 19, 1989, abandoned.

[51] Int. Cl.⁵ .............................................. B62D 35/00
[52] U.S. Cl. ................................... 296/180.2; 105/1.2
[58] Field of Search ............... 296/180.1, 180.2, 180.3, 296/180.5; 105/1.2, 1.3, 10, 14, 21

[56] References Cited

U.S. PATENT DOCUMENTS 4,142,755 3/1979 Keedy .............................. 296/180.2
4,746,160 5/1988 Wiesemeyer ...................... 296/180.2

Primary Examiner—Margaret A. Focarino
Assistant Examiner—Andrew C. Pike
Attorney, Agent, or Firm—Dennis K. Sullivan

[57] ABSTRACT

An aerodynamic-gap sealing structure for a tractor-trailer combination includes rigid multipiece articulating shields at rear corners of the tractor and extending rearwardly to engage a side of a front face of the trailer. Similarly, a cab of the tractor is provided with a roof extension pivotally mounted on a top corner of a roof, or roof fairing, of the cab and extends rearwardly and upwardly to a roof of the trailer disposed thereabove. The side shields include a plurality of panels, preferably three, between the cab and the trailer which are pivotally connected to each other by centering springs to allow for varying distances between the cab and the trailer corners as a turn is negotiated while normally maintaining the panels as a straight extension from the cab to the trailer. A cam-operated linkage near the fifth wheel is connected to automatically raise the roof extension on the tractor to allow the trailer to move under the roof extension when the tractor and the trailer are being connected, the roof extension lowering onto the top of the trailer when the connection is completed. The device encloses the gap between the tractor cab and the trailer to provide streamlined airflow around the over the vehicle.

9 Claims, 5 Drawing Sheets

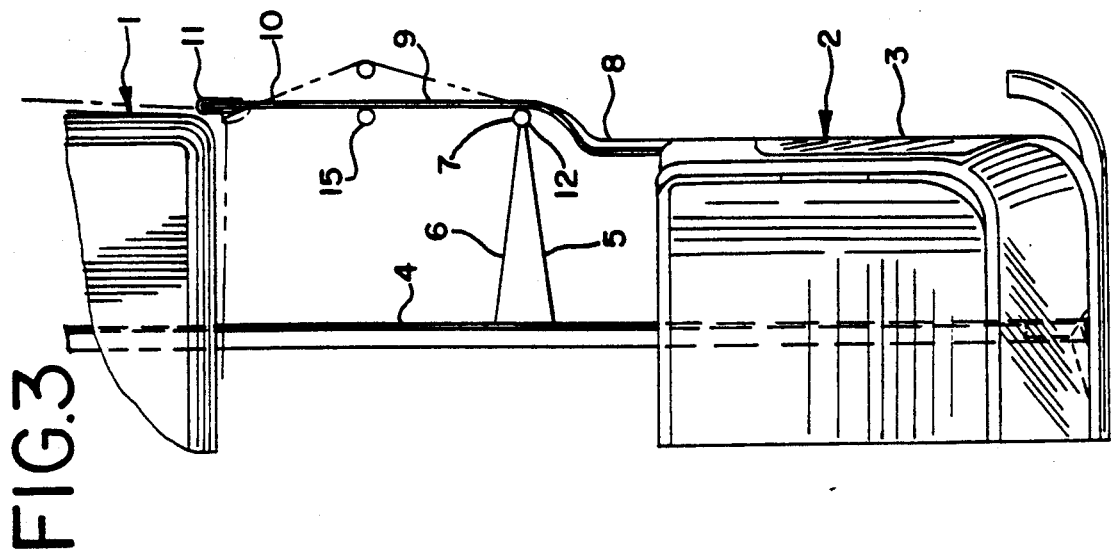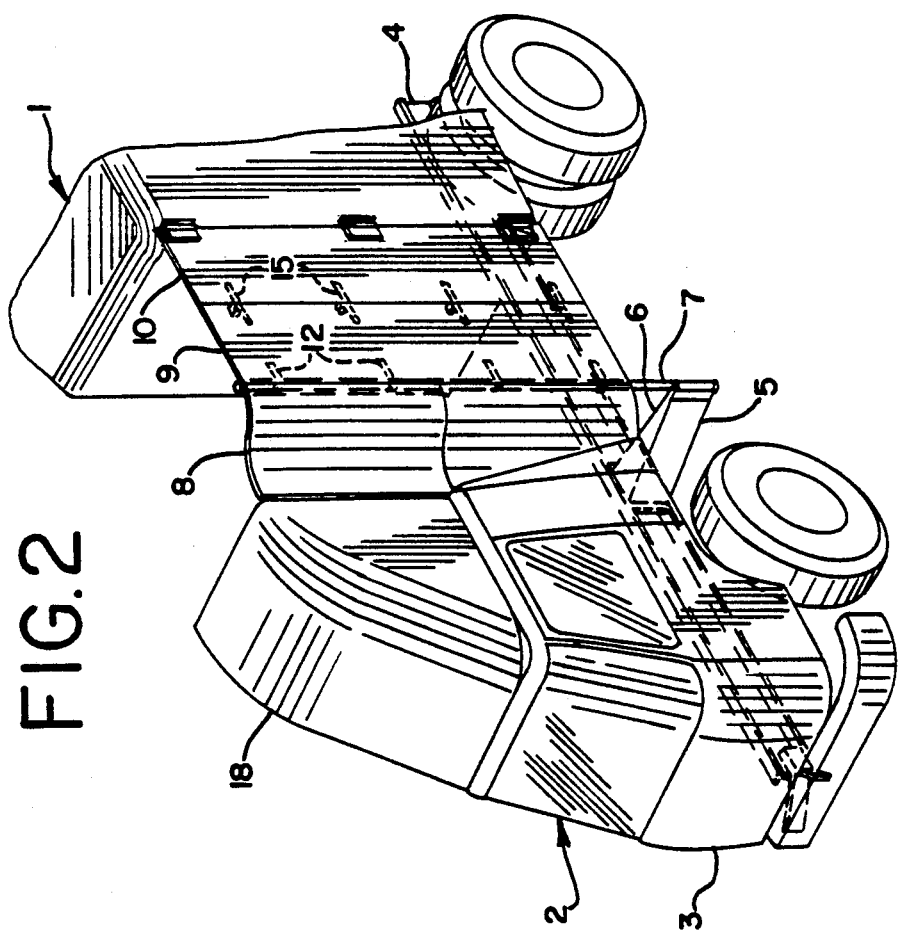

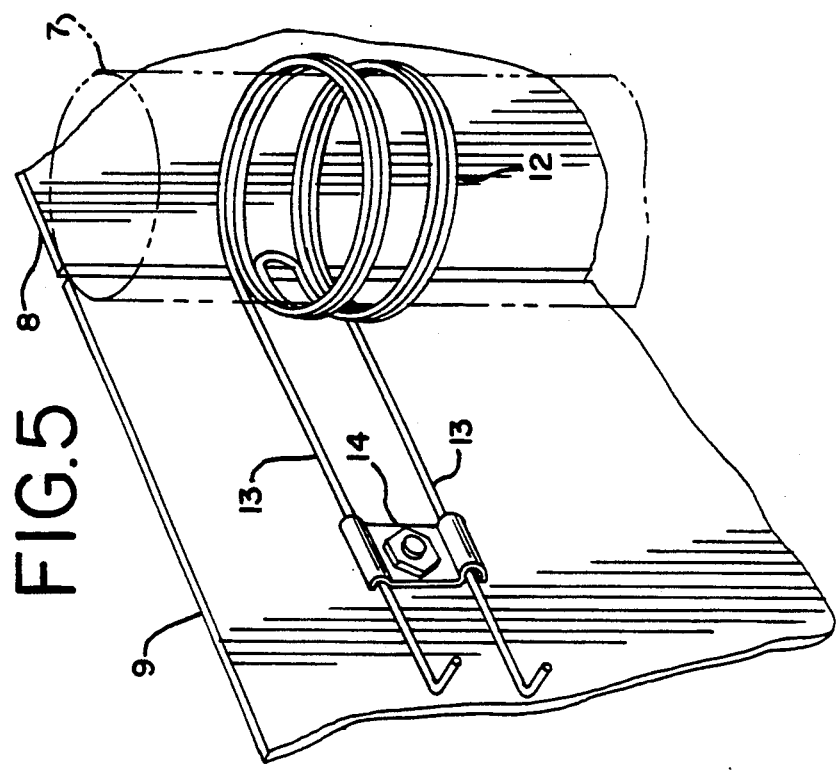
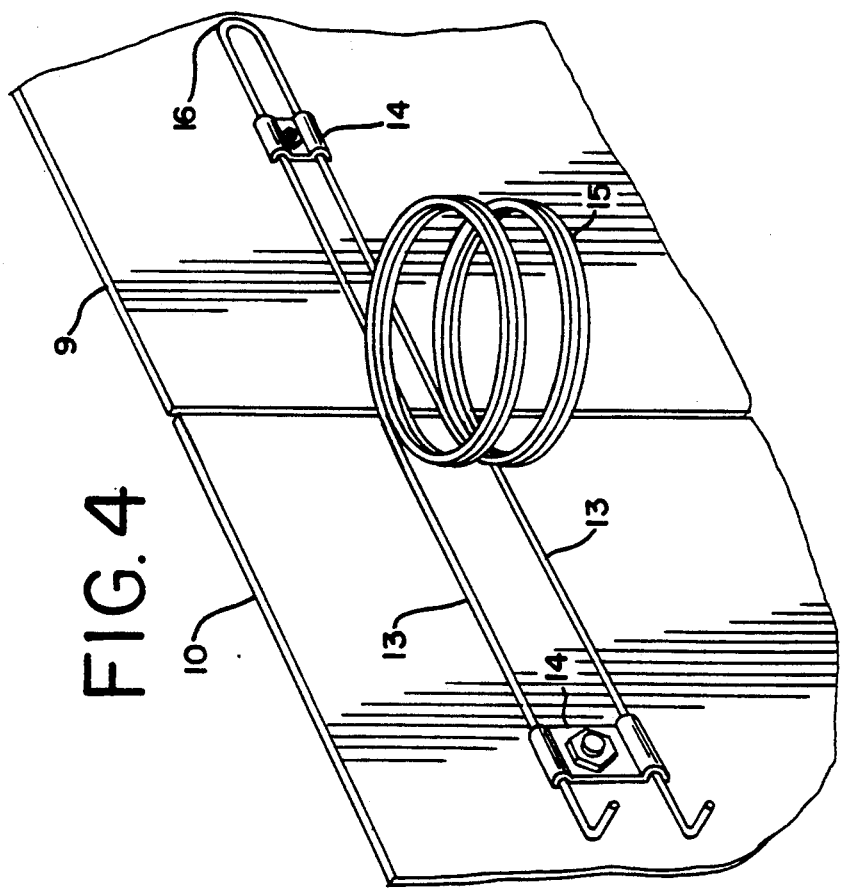

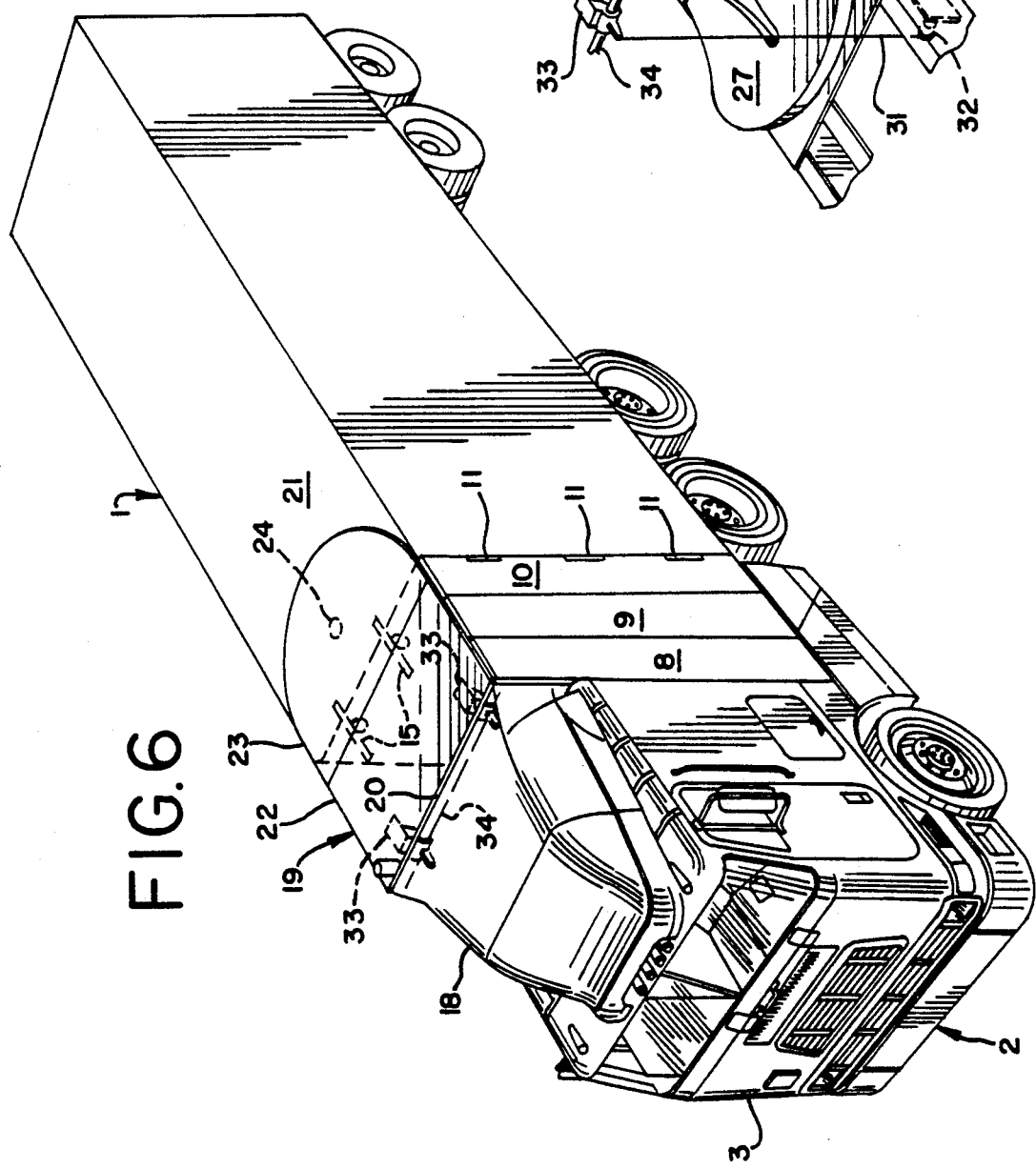

CAB TO TRAILER AIR DEFLECTOR

CROSS-REFERENCE TO RELATED APPLICATION

This application is a continuation-in-part of application Ser. No. 07/353,991, filed May 19, 1989, and now abandoned.

BACKGROUND OF THE INVENTION

This invention relates to an airflow shield between a cab and a trailer of a semi-trailer truck to improve airflow around the vehicle and, more particularly, to a flexible shield which allows pivotable movement between the tractor and the trailer while closing the gap therebetween and which also provides a roof extension which automatically raises as the trailer mounts the fifth wheel to permit the trailer to be connected to the tractor. The two piece construction of the roof extension also allows it to adapt to variations in trailer heights.

The semi-trailer truck, as used for hauling cargo over the highway, has advantages over the conventional truck in that it can carry a much larger cargo and also is more adaptable for steering the truck in close quarters. One disadvantage, however, is that there is a gap between the tractor and trailer which will increase the aerodynamic drag of the tractor-trailer combination compared to a straight truck having a body of the same frontal area as the trailer.

Another of the disadvantages caused by the gap between the tractor and trailer is that air turbulence and uneven air pressures occurring along the sides of the trailer accentuate the tendency of a trailer to yaw and add to the difficulty of steering and handling the combination on the highways.

U.S. Pat. No. 3,711,146 shows a device which streamlines a tractor-trailer by completely closing the gap to reduce the aerodynamic drag. However, the device itself is not very streamlined.

U.S. Pat. No. 4,750,772 also shows a streamlining device on a tractor-trailer combination which has rigid extenders for the sides and a roof fairing which extend into the gap as far as possible without interfering with normal trailer movement relative to the tractor and including a small elastomeric section to prevent damage to the trailer and/or extenders if the trailer should articulate excessively. These extenders do not close the gap but only minimize it.

U.S. Pat. No. 2,101,793 teaches a side extenders which close the gap and are spring loaded to contact the front of the trailer through rollers. U.S. Pat. No. 4,397,496 teaches similar extenders but made of flexible materials. However, the trailers in both patents have a round front end which is not very practical from a cargo space standpoint and has been largely discarded by the trailer industry. Rectangular trailer fronts will not accommodate spring loaded extenders and flexible extenders of more than a few inches will tend to bend under the aerodynamic forces encountered by a tractor-trailer at highway speeds especially in cross winds.

SUMMARY OF THE INVENTION

It is an object of this invention to provide cab roof and side panel extenders for a tractor-trailer combination which close the gap between the tractor and the trailer to improve the vehicle aerodynamic efficiency.

It is a further object of this invention to provide an aerodynamic air shield to aerodynamically improve airflow around a semi-trailer vehicle by providing a rigid multi-piece articulating side extender extending between the rear wall of the tractor and the front wall of the trailer.

Still a further object of the invention is to provide an articulating side extender for closing the gap between a tractor and a trailer having three rigid panels with two articulation joints therebetween.

Yet another object of the invention is to provide an extender for the top wall of the cab, or of a roof fairing thereon, which is automatically raised to allow connection of the trailer to the tractor and automatically lowered to the trailer roof once the two are connected.

The objects of this invention are accomplished by rigid multipiece articulating side shields disposed at the rear corners of the tractor and extending rearwardly to engage the side of the front face of the trailer. Similarly, a roof extension is pivotally mounted on the top corner of the roof of the cab or of the roof fairing, if present, and extends rearwardly and upwardly to the roof of the trailer. The side shields include a plurality of panels, preferably three, between the cab and the trailer which are pivotally connected to each other by centering springs to allow for varying distances between the cab and the trailer corners as a turn is negotiated while normally maintaining the panels as a straight extension from the cab to the trailer. A cam-operated linkage near the fifth wheel is connected to automatically raise the roof extension on the tractor to allow the trailer to move under the roof extension when the tractor and the trailer are being connected, the roof extension lowering onto the top of the trailer when the connection is completed. The device encloses the gap between the tractor cab and the trailer to provide streamlined airflow around and over the vehicle.

DESCRIPTION OF THE DRAWINGS

Referring to the drawings, the preferred embodiments of this invention are illustrated.

FIG. 2 is a three dimensional view of the left half of the vehicle shown in FIG. 1.

FIG. 3 is a left half plan view of the vehicle shown in FIGS. 1 and 2.

FIG. 4 is a partial perspective view of the mounting of the centering springs between the middle and the rear panels.

FIG. 5 is a partial perspective of the mounting of the centering spring to the forward part of the middle panel.

FIG. 6 is a perspective view of a vehicle which consists of a tractor-trailer with a roof fairing assembled on the vehicle and further including a roof panel for closing the gap constructed in accordance with the invention.

FIG. 7 is a perspective view of a fifth wheel of the vehicle of FIG. 6 and a cam-operated linkage which operates to lift the roof panel extension when connecting the tractor to the trailer.

DESCRIPTION OF THE PREFERRED EMBODIMENTS

Figure 1:
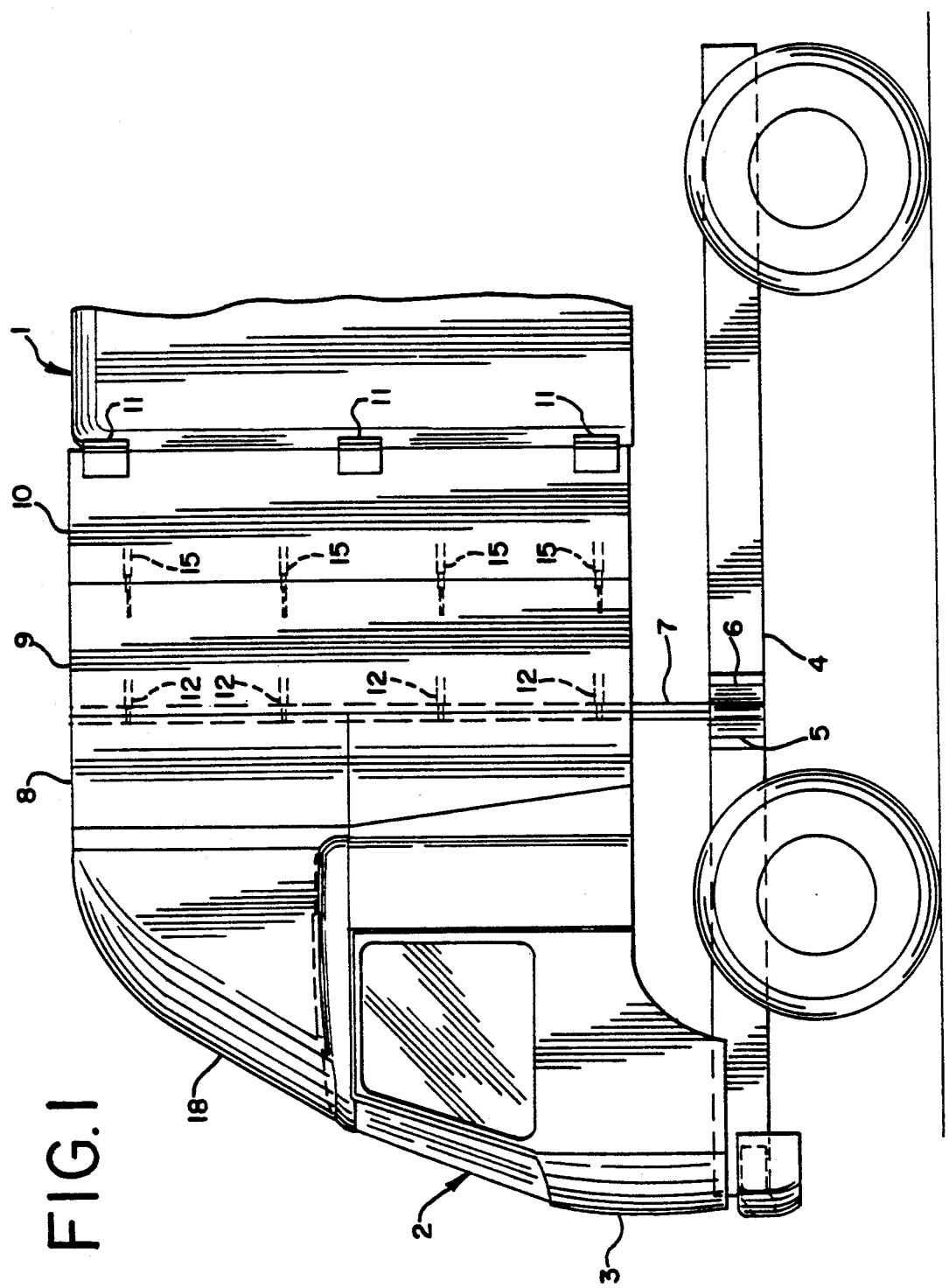
FIG. 1 is a side view of a vehicle having multipiece side shields in accordance with the invention.

Referring to the drawings, the preferred embodiments are illustrated. FIGS. 1, 2, and 3 show segmented side panels mounted on a tractor cab of a tractor-trailer combination to provide an airflow shield between the tractor and the trailer. Although shown transparent for purposes of illustration, the panels and cab in practice are not transparent and the tractor-trailer appearance is similar to that shown in FIG. 6. The trailer partially shown at 1, a conventional cargo trailer having side walls, a front face, and a roof joined in mutually perpendicular relation by radiussed corners, is shown connected to the tractor 2. The connection for the tractor and the trailer is not shown in this view but is a conventional fifth wheel as shown in FIG. 7. The cab 3 is mounted on a chassis 4 of the tractor 2 which also supports brackets 5 and 6 which in turn support a vertical pivot support structure 7 which supports the rear edge of a fixed forward side extender panel 8 which extends from the rear corner of the cab 3 as an aerodynamically efficient continuation of the side wall thereof. The vertical support 7 pivotally supports rigid planar rear panels 9, 10 of the segmented airflow shield through centering springs 12 affixed to the vertical support structure 7, the centering springs having leg portions 13 which extend along the inner side of the panel 9 to hooked ends, the legs 13 being clamped to the inner side of the panel by a clamp 14 as shown in FIG. 5.

As shown in FIG. 4, the panel 10 is mounted to the rearward edge of the panel 9 by centering springs 15 which also have legs 13 extending along the inside of the panel 10 and are clamped thereto similar to springs 12. However, centering springs 15 are also provided with a forwardly extending integrally formed U-shaped bail 16 which is clamped to the inner side of the panel 9 by the clamp 14 so that the panel 10 is supported to articulate relative to the panel 9 about a vertical axis while the panels 9 and 10 together may articulate relative to the fixed panel 8 about the vertical pivot support 7 while the centering springs 12 and 15 maintain the panels in planar alignment to smoothly channel airflow from the fixed side extender panel 8 to the trailer sides as shown in FIG. 3. The panel 10 is fitted with rollers 11 on the rearward end thereof which engage the front corner of the trailer 1 when a turn is being negotiated or when the tractor and the trailer are realigning after a turn. Although the articulation at pivot 7 would appear to be adequate to accommodates turns, with a rectangularly-cornered trailer, it would be possible for the trailer corners to impose a buckling load on the panels 9 and 10, for example, if the tractor were on an upwardly angled ramp while the trailer were still on level ground, or for the trailer sides to impose such a buckling load, for example, if the tractor and the trailer were jackknifed. In that event, the pressure on the rollers will cause the panels 9 and 10 to articulate at the connection provided therebetween by centering springs 15, as shown in phantom lines in FIG. 3; that is, the two rigid panels 9 and 10 are permitted to buckle relative to the forward panel 8 upon contact of the rearward panel 10 with the trailer 1. As the cab and the trailer are straightened out and in the normal straight ahead position, the springs and the pivots will cause the panels to return to the position shown in FIGS. 1, 2, and 3.

Although a roof fairing 18, shown mounted on the cab 3 in FIGS. 1, 2, and 3, does improve the airflow between the tractor and the trailer, a roof panel extension 19 of the present invention extends all the way to the trailer to further improve the airflow over the vehicle. In accordance with the invention, to accommodate the lifting of the trailer front to slide it onto the fifth wheel connection with the tractor, the roof fairing extension 19 is elevated as the tractor and the trailer are connected. FIG. 6 shows the assembly of the tractor-trailer combination with the roof panel extension 19 extending over the roof of the trailer from the upper rear edge 20 of the cab roof fairing rearwardly over the roof 21 of the trailer 1. The roof panel extension 19 comprises two articulated rigid planar panels 22 and 23 which are connected by centering springs 15 in the same manner as those supporting the side panel 10, as described above. However, due to the horizontal orientation of the articulation axis, the weight of the rear panel 23 will be partly supported by the springs 15. The rest of the weight of the panel 23 may be supported on a small wear plate 24 attached to the roof 21 of the trailer 1 in order to reduce frictional wear therebetween.

Figure 8:
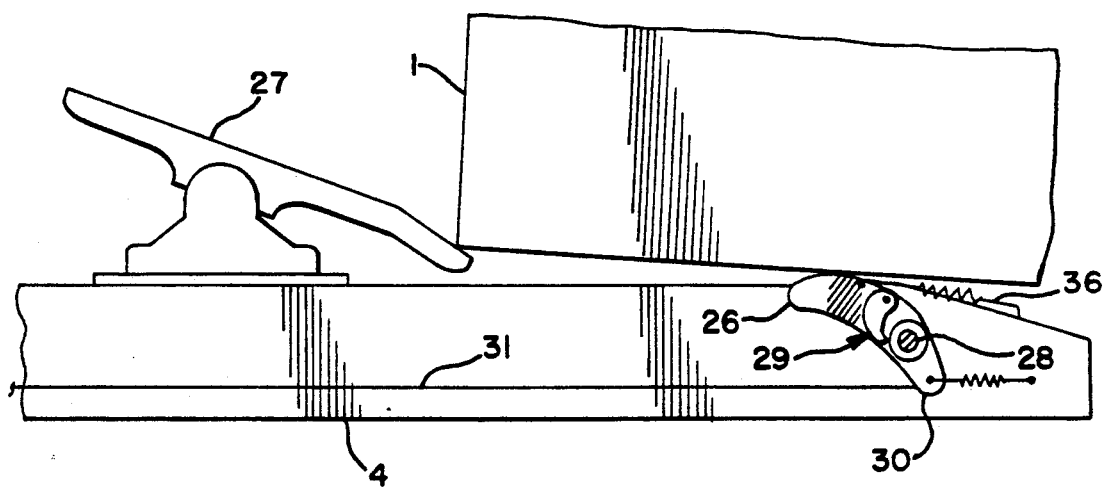
FIG. 8 is a side view of a portion of the tractor and the trailer of FIG. 6 during the process of coupling the trailer to the tractor.
Figure 9:
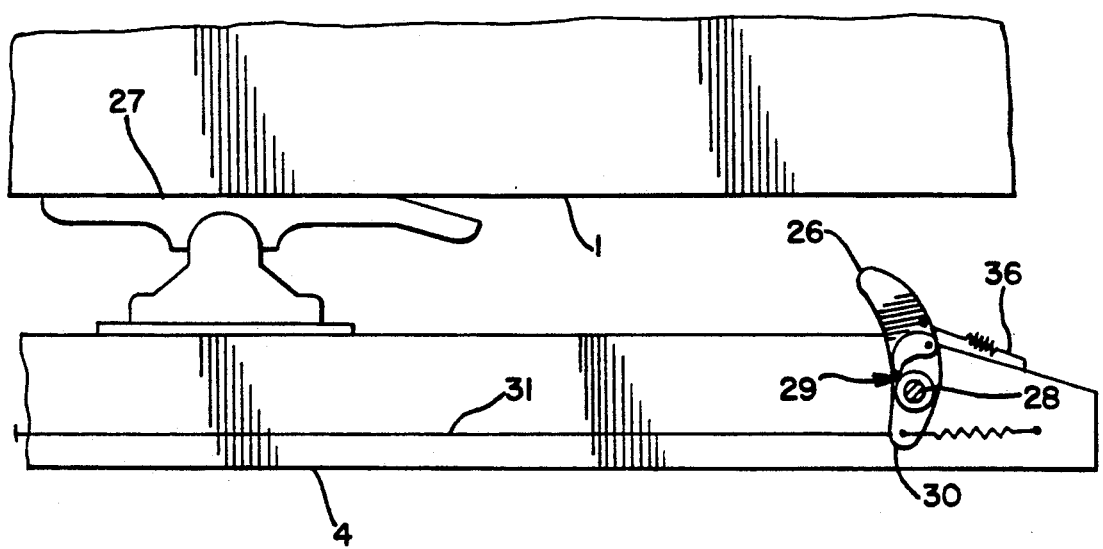
FIG. 9 is a side view of a portion of the tractor and the trailer of FIG. 6 showing the trailer coupled to the tractor.

The lift linkage 25 connected between the roof extension 19 and the chassis 4 adjacent the fifth wheel 27 for controlling the extension 19, as shown in FIGS. 7-9, comprises a cam arm 26 which engages the bottom of trailer 1 when the trailer slides onto the chassis 4 to be connected to the fifth wheel 27. The cam arm 26 is connected to rockshaft 28 mounted on chassis 4 adjacent the fifth wheel by a conventional ratchet and pawl mechanism 29 so that when the cam arm 26 is rotated forwardly, as by contact with the bottom of the trailer 1, the ratchet and pawl mechanism 29 will rotate the rockshaft 28 whereas rotation of the cam arm 26 in the rearward direction, as by spring 36, will not rotate the rockshaft.

A bellcrank 30 is fixedly attached to the rockshaft 28 and, upon rotation of the rockshaft 28 by the cam arm 26, pulls on a cable 31 which is fed around a pulley 32 up to the rear panel 20 of the roof fairing whereat the cable 31 operates a lever 33 pivotally connected to the fairing by a pivot shaft 34 to lift the roof edge extension 19 sufficiently to allow the roof 21 of the trailer 1 to slide underneath the rear panel extension 23. When the trailer is in position on the fifth wheel, as shown in FIG. 9, the cam arm 26 is no longer contacted by the trailer bottom to tension cable 31 and the rear panel extension 23 seats on the wear plate 24 for operating on the highway.

The device shown in FIGS. 1, 2, and 3 illustrates use of segmented side shields which provide a streamline side structure and also provide an aerodynamic structure which improves the airflow over the top of the vehicle. The device shown in FIGS. 6 and 7 shows a complete gap sealing structure (except on the bottom side) with similar segmented side shields but also with a roof panel extension which extends from the cab roof fairing to the trailer roof and provides maximum efficiency of airflow over the vehicle. This device can be connected or disconnected with ease since the linkage 25 elevates the roof extension to allow connection of the trailer to the fifth wheel.

What is claimed is:

1. In an articulated vehicle including a tractor, said tractor having a chassis and a cab mounted on the chassis, and a trailer pivotally connected to said tractor through a fifth wheel mounted on said chassis, said trailer having a roof, side walls, and a front face, an aerodynamic shield extending between said cab and said trailer comprising:

a roof fairing mounted on said tractor cab;

a roof extension pivotally connected across an upper rear edge of said fairing and extending rearwardly over the roof of said trailer; and automatic means mounted on said tractor for operatively engaging said roof extension for pivoting said extension upwardly, said automatic means being responsive to an engagement thereof by said trailer upon said trailer engaging said tractor to establish a coupling therebetween.

2. The aerodynamic shield as set forth in claim 1 wherein said automatic means comprises a lift linkage connected between said roof extension and said chassis adjacent said fifth wheel, said linkage being disposed to raise said roof extension upon initial contact of said trailer therewith during coupling of said trailer to said tractor.

3. The aerodynamic shield as set forth in claim 2 wherein said lift linkage is further disposed to release said roof extension to allow said roof extension to engage the roof of said trailer upon completion of the coupling of said tractor and said trailer.

4. The aerodynamic shield as set forth in claim 1 further including a wear plate between said roof extension and said trailer.

5. The aerodynamic shield as set forth in claim 1 wherein said automatic means comprises a lift linkage connected between said roof extension and said chassis adjacent said fifth wheel, said linkage including a rockshaft, and a cam on said rockshaft for engaging said trailer when coupling said trailer to said tractor.

6. An articulated vehicle comprising:

a tractor and trailer pivotally coupled together, said tractor having a cab having side walls, said trailer having side walls, a front wall, and a top wall, said cap and said trailer having a gap therebetween; and an aerodynamically efficient multipiece side air shield, said air shield having a rigid forward panel fixedly mounted on said tractor rearwardly adjacent said cab, a rearward panel means extending rearwardly from said forward panel to an end adjacently engageable with said trailer, and centering springs disposed between said forward panel and said rearward panel means for permitting articulation therebetween while normally biasing said rearward panel means to a position forming a smooth continuation of said forward panel to said engageably adjacent end.

7. An articulated vehicle as set forth in claim 6 wherein said air shield encloses the gap between the side walls of said tractor cab and the side walls of said trailer.

8. An articulated vehicle as set forth in claim 6 further including rollers on the end of said rearward panel means for engaging said trailer.

9. An articulated vehicle as set forth in claim 6 wherein said rearward panel means comprises two rigid panels joined together by centering springs normally biased to maintain said two rigid panels in coplanar relation while permitting said panel means to buckle upon contact of said rearward panel means with said trailer.

* * * * *